United States Patent Office

2,878,126
Patented Mar. 17, 1959

2,878,126

FOOD PRODUCT AND METHOD OF MAKING THE SAME

James Gordon Roberts, Elkhorn, Nebr.

No Drawing. Application December 31, 1956
Serial No. 631,461

11 Claims. (Cl. 99—117)

This invention relates to a new food product and, more particularly, to a dairy spread having a relatively low percentage of butterfat but having taste, texture and spreadability similar to butter, and to a method of preparing the same.

The principal object of this invention is to produce a new dairy spread essentially from dairy products, which spread may be manufactured and sold competitively with non-dairy vegetable spreads.

Butter, at least about 80% of which is butterfat, is a very important dairy product. It is also most expensive to produce, and it requires a high retail price. Non-dairy vegetable spreads, on the other hand, may be inexpensively produced and sold, and as a consequence the great disparity in retail price has caused the dairy industry to lose a large portion of its market for butter. It is, therefore, an object of this invention to provide a dairy spread utilizing a minimum of butterfat and to thereby create a novel product which may be sold competitively with oleomargarine and other non-dairy vegetable spreads.

Another object of this invention is to produce a substantially all-dairy food product which has a taste, consistency and spreadability similar to that of butter, and which has keeping qualities at least as good as butter.

A typical analysis of butter is as follows:

| | Percent |
|---|---|
| Butterfat | 80 |
| Non-fat milk solids | 1 |
| Water | 17.0 |
| Salt | 2.0 |

Butter contains as a part of the above-named solids about 1% protein. Butter is a smooth, reasonably firm, close-textured substance solid at ordinary temperatures having a yellowish white to a deep yellow color and a characteristic flavor and aroma.

Milk, on the other hand, has the following typical composition:

| | Whole Milk, percent | Skim Milk, percent | Buttermilk, percent |
|---|---|---|---|
| Butterfat | 4 | 0.1 | 0.4 |
| Non-fat milk solids | 9 | 9.4 | 8.6 |
| Water | 87 | 90.5 | 91.0 |

Whole milk contains about 3.3% protein, skim milk about 3.6%, and buttermilk about 3.5% protein. Whole, skim and buttermilk are in liquid form.

Uncreamed cottage cheese, in contrast to butter and milk, has the following typical composition:

| | Percent |
|---|---|
| Butterfat | 0.5 |
| Non-fat milk solids | 23 |
| Water | 76 |
| Salt | 0.5 |

Cottage cheese contains about 19.5% protein, and is a white, smooth, firm unripened curd obtained from skim milk, having a clean and mild flavor, its body varying with the moisture content.

From the above it may be seen that there are substantial differences in the compositions of these products, as well as in their physical characteristics. As between butter, milk and cottage cheese an increase in butterfat appears to be accompanied by a decrease in the non-fat milk solids. Each of these products is in imbalance as to either butterfat, non-fat milk solids or water. Each has its own nutritional advantage and each has its own physical form; whereas, cottage cheese contains a relatively high percentage of protein and non-fat milk solids, butter and milk contain negligible amounts of these constituents, and although butter contains a large amount of butterfat and a small amount of water, both milk and cottage cheese contain relatively small amounts of butterfat and large amounts of water.

The constituents of these respective products also create an accurate index of their relative price, for example, butter, containing a large amount of butterfat, is the most expensive. Milk, containing the most water, is the least expensive, and cottage cheese, containing a small amount of butterfat, relatively large amounts of non-fat milk solids and protein and a large amount of water, is in the intermediate price range.

Food products having a somewhat lesser percentage of butterfat than that of butter have been known in the art, but until the product of this invention, no such product has been made which is economically competitive with non-dairy spreads. Heretofore, when the butterfat content was reduced to the point that the product could be marketed at a sufficiently low price, the product itself was inferior to non-dairy vegetable spreads. The amount of butterfat in such products was reduced below that present in butter by means of the addition of relatively large amounts of non-dairy butter extenders such as the margarines. These extenders were utilized in order to retain the physical characteristics of the butter, although, in many respects, the butter characteristics were drastically diluted. Further, such products contained only the amount of protein-carrying nutritionally advantageous non-fat milk solids present in the butter used—a negligible amount. To overcome this, other milk products such as skimmed milk and buttermilk have been added thereto, but nevertheless, the products were merely further diluted and did not maintain the flavor and taste of butter, thus requiring the addition of coloring and flavoring agents. In such products the percentage of non-fat milk solids was consistently maintained at a low level, rarely even approaching the percentage of butterfat present in the product. It was probably thought that the butterfat content determined the physical character of the product, therefore the amount of butterfat was the dominating factor in the production.

My new product has the desirable physical characteristics of butter, the nutritional advantages of cottage cheese, and the economic advantages of milk, or stated another way, it contains a relatively small amount of butterfat, a relatively high amount of non-fat milk solids, and a relatively large amount of water.

The novel product of this invention comprises about 22–28% butterfat, about 15–16% milk solids not fat, of which about 3.5–4.5% is lactose based on the total composition, and the balance being essentially water in an amount not exceeding about 60%.

The milk fat or butterfat ingredient can be derived from any source just so long as the butterfat is not present in low concentrations which make its use prohibitive. The term "butterfat" is not intended to be a limitation on the source from which the material is derived. In the event that the quantity of butterfat is reduced below 22% by weight based on the total composition, there are definite indications of roughness or leakiness of body. The product is too unstable to be sold commercially. On the other hand, when the quantity of butterfat exceeds about 28% by weight, it is found that the product begins to lose the characteristics of a low fat spread, not to mention the unattractiveness from an economical standpoint.

The milk solids not fat constitute an important ingredient of the product of this invention. The milk solids contain principally proteinaceous material, lactic acid and lactose. The lactic acid imparts an acidic flavor to the product, whereas lactose, being a milk sugar, imparts sweetness to the same. To obtain the unusual product of this invention, it is necessary that the quantity of milk sugar be controlled to within certain defined ranges. The lactose content of the spread is about 3.5–4.5% by weight based upon the total composition, whereas lactic acid is controlled so that the final product has a pH of about 6.0–6.2. The protein content of the milk solids not fat constitutes about 11–12% by weight based on the total composition. The milk sugar or lactose obtained by proper admixture of a lactose containing material, e. g. condensed skim milk or dry milk powder and a lactose free material, e. g. sodium caseinate. Ordinarily the conventional sources of milk solids not fat have greater quantities of lactose than is desired in the final product. Hence, to produce a spread having the desired flavor, spreadability and texture, the milk solids not fat should be in the range of 15–16% by weight and yet the lactose content should be in the range of 3.5–4.5% by weight. Sodium caseinate is a material which is ideally suited as a source of milk solid not fat because of its bland characteristic. It enables me to meet the requirement of milk solids not fat content without impairment of flavor.

Cottage cheese curd contains a significant amount of calcium caseinate. Calcium caseinate is unsuitable for this invention because it is not possible to obtain a smooth textured spread by its use. It was found quite unexpectedly that sodium caseinate in admixture with other components of the spread results in an exceptionally smooth bodied material. The sodium caseinate is produced from calcium caseinate. Cottage cheese curd contains sufficient calcium caseinate to be a good starting material for the production of sodium caseinate. The calcium caseinate is treated with an edible alkaline compound of sodium so as to convert the same to sodium caseinate. The quantity of sodium compound to be used is based upon the lactic acid content of the cottage cheese curd. For the purpose of this invention about .9–1.0 parts, preferably .94 part, of sodium compound to one part of lactic acid are used. The sodium compound, preferably sodium bicarbonate, is dissolved in water and then added to the curd. The reaction mixture is held at a temperature of 100–110° F. until the curd is completely dissolved. Usually it takes about 3½–4 hours to accomplish this step of the operation. Thereafter, the thick liquid product is pasteurized and allowed to cool to a temperature of 75–80° F. The product thus obtained is principally sodium caseinate. Sodium caseinate is bland in characteristic but it contributes to the protein value of the product of this invention.

The milk solids not fat constitute about 15 to about 16% by weight of the total composition. These solids are primarily lactose, sodium caseinate, etc. In regard to the lactose, it is found that when the concentration falls below 3.5% the product containing the same becomes too bland in quality, whereas when the concentration is about 4.5% the flavor becomes objectionably sweet. The concentration of sodium caseinate in the dairy spread can vary considerably depending upon the source from which the milk solids not fat are derived and the extent of treatment required to control the lactose content to the range given hereinabove. Ordinarily, it is found that sodium caseinate comprises about 50% of the milk solids not fat or it can vary from about 7.5–8% by weight of the total composition. In some instances sodium caseinate can be used in a dry state and thus makes possible the use of a low butterfat cream in the preparation of the dairy spread. Fresh cream can be used in this case and it contains about 40% by weight butterfat.

The water content of the product of this invention comprises essentially the balance. However, it should not exceed about 60% by weight based on the total composition. At concentrations greater than about 60%, it is noted that the product has a pronounced tendency to separate moisture and has an objectionably leaky body. The minimum concentration of water is governed by the quantity of other materials which are incorporated into the dairy spread. For example, common salt, sodium chloride, can be used in a quantity of about 1–2%; a lactic acid producing microorganism such as, for example, *Lactobacillus bulgaricus* or *Lactobacillus acidophilus*, can be added in an amount not exceeding about 0.5% by weight based on the total composition. Other additive materials such as vitamin concentrate, fungistats, e. g. sorbic acid, etc., can also be added in relatively small quantities.

When cottage cheese curd and condensed skim milk are used as the source of milk solids not fat, usually the source of material for the butterfat contains at least about 60% of the same and ranges up to about 80% by weight. On the other hand, when the source of milk solids not fat is dried sodium caseinate, greater latitude is permitted in the concentration of the butterfat source in that fresh cream containing 40% by weight of butterfat can be used for this purpose.

In the preparation of the dairy spread, sodium caseinate with or without condensed skim milk is pasteurized at a temperature of about 170° F. and thereafter cooled to a temperature of 75–80° F. Should it be necessary to store these materials for any length of time, it is desirable that the storage temperature be maintained at 35–40° F. Below 35° F. there is a danger of crystallization occurring which impairs the quality of the dairy spread. Above 40° F. the risk of spoilage becomes significant and hence should be avoided. The butterfat containing material, for example, plastic cream containing 80% butterfat, is placed in a mixing bowl and moderately agitated to produce a folding effect. While agitation is continued, sodium caseinate and condensed skim milk are added to the bowl. After these materials have been thoroughly mixed, salt or other additive materials are added to the bowl while agitation is continued. If necessary, water is added to the mixture. Throughout the mixing operation it is important that the temperature be maintained at 75–80° F. It is found that if the temperature is varied to any significant extent there is poor incorporation of the ingredients, and if carried far enough, the consistency of the product is poor and the appearance leaves much to be desired.

In order to demonstrate the effects of varying the concentrations of the various ingredients, several experiments were performed in which the products, in accordance with the above described method, were prepared by using a 50:50 mixture of (1) cottage cheese curd (containing 22% solids) which was treated with .94 part of sodium bicarbonate to one part of lactic acid contained in the curd at 100–110° F. and (2) condensed skim milk (containing 30% solids), plastic cream containing 80% butterfat and 1% common salt or sodium chloride. The results of these experiments are tabulated below:

Table I

| Example No. | Butterfat | Milk Solids, Not Fat | Water | Lactose | Body and Texture | Flavor |
|---|---|---|---|---|---|---|
| 1 | 26 | 16.61 | 57.39 | 4.68 | Smooth, almost waxy. | Sweet flavor. |
| 2 | 25 | 14.32 | 59.68 | 3.20 | ----do---- | Bland flavor. |
| 3 | 24 | 15.58 | 59.32 | 4.20 | ----do---- | Good flavor. |
| 4 | 23 | 15.49 | 60.51 | 4.14 | Trace of moisture. | Do. |
| 5 | 22 | 15.47 | 61.52 | 4.13 | Moisture separation. | Do. |
| 6 | 21 | 15.45 | 62.77 | 4.12 | ----do---- | Pronounced salt flavor. |

It is to be noted that when the lactose content exceeded 4.5% the product became noticeably sweet in flavor. On the other hand, when the concentration of lactose fell below 3.2% the product had a bland flavor. Those products containing lactose in the concentration specified for the purpose of this invention had good flavors. It is also to be noted that where the concentration of water was increased above 60% by weight, the product showed definite signs of moisture separation. Further, where the concentration of butterfat fell below 22% by weight, the unstability of the product was accentuated.

Having thus provided a description of my invention along with specific examples thereof, it should be understood that no undue restrictions or limitations are to be imposed by reason thereof, but that the scope of the invention is defined by the appended claims.

I claim:

1. A composition comprising about 22–28% butterfat, about 15–16% milk solids not fat, said milk solids not fat containing sodium caseinate and about 3.5–4.5% lactose based on a total composition, the sodium caseinate constituting about 50% of the milk solids not fat, and the balance being essentially water in an amount not to exceed about 60%.

2. A composition comprising modified cream containing about 60–80% butterfat, condensed skim milk, sodium caseinate and water, said composition being characterized by containing about 22–28% butterfat, about 15–16% milk solids not fat, said milk solids not fat containing about 3.5–4.5% lactose based on the total composition, the sodium caseinate constituting about 50% of the milk solids not fat, and the balance being essentially water in an amount not exceeding about 60%.

3. A composition comprising modified cream containing about 40% butterfat, milk solids not fat containing sodium caseinate, and water, said composition being characterized by containing about 22–28% butterfat, about 15–16% milk solids not fat, said milk solids not fat containing about 3.5–4.5% lactose based on the total composition, the sodium caseinate constituting about 50% of the milk solids not fat, and the balance being essentially water in an amount not exceeding about 60%.

4. A composition comprising about 22–28% butterfat, about 15–16% milk solids not fat, said milk solids not fat comprising about 7.5–8% sodium caseinate based on the total composition and about 3.5–4.5% lactose based on the total composition, and the balance being essentially water in an amount not exceeding about 60%.

5. A composition comprising about 22–28% butterfat, about 15–16% milk solids not fat, said milk solids not fat containing sodium caseinate and about 3.5–4.5% lactose based on the total composition, sodium chloride in an amount not exceeding about 2%, the sodium caseinate constituting about 50% of the milk solids not fat, and the balance being essentially water in an amount not exceeding about 60%.

6. A method of preparing a spread which comprises combining about 22–28% butterfat, about 15–16% milk solids not fat, said milk solids not fat containing sodium caseinate and about 3.5–4.5% lactose based on the total composition, the sodium caseinate constituting about 50% of the milk solids not fat, and the remainder water essentially in an amount not exceeding about 60%, mixing the resultant mixture at a temperature of about 75–80° F. until a homogeneous product is obtained.

7. A method of preparing a spread which comprises treating cottage cheese curd with an edible alkaline compound of sodium under conditions to convert calcium caseinate to sodium caseinate, combining the sodium caseinate product with condensed skim milk and butterfat, mixing said ingredients at a temperature of about 75–80° F. to produce a product containing about 22–28% butterfat, about 15–16% milk solids not fat, said milk solids not fat containing about 3.5–4.5% lactose based on the total composition, the sodium caseinate, constituting about 50% of the milk solids not fat, and the balance being essentially water in an amount not exceeding about 60%.

8. A method of preparing a spread which comprises treating cottage cheese curd with an edible alkaline compound of sodium under conditions to convert calcium caseinate to sodium caseinate, combining the sodium caseinate with condensed skim milk, plastic cream containing about 60–80% butterfat, and water, mixing the ingredients at a temperature of about 75–80° F. to produce a homogeneous product, said product characterized by containing about 22–28% butterfat, about 15–16% milk solids not fat, said milk solids not fat containing about 3.5–4.5% lactose based on the total composition, the sodium caseinate constituting about 50% of the milk solids not fat, and the balance being essentially water in an amount not exceeding about 60%.

9. The method of claim 8 wherein the edible alkaline compound of sodium is sodium bicarbonate.

10. A composition comprising about 24% butterfat, about 15% milk solids not fat, said milk solids not fat containing sodium caseinate and about 4% lactose based on the total composition, the sodium caseinate constituting about 50% of the milk solids not fat, 1–2% sodium chloride and 60% water.

11. A composition comprising about 22–28% butterfat, about 15–16% milk solids not fat, said milk solids not fat containing sodium caseinate and about 3.5–4.5% lactose based on the total composition, the sodium caseinate constituting about 50% of the milk solids not fat, the balance being essentially water in an amount not exceeding about 60%, and said composition having a pH of about 6.0–6.2.

References Cited in the file of this patent

UNITED STATES PATENTS

| 592,215 | Bearden | Oct. 19, 1897 |
| 2,622,984 | Peebles et al. | Dec. 23, 1952 |

OTHER REFERENCES

"By Products From Milk," by Whittier et al., Reinhold Publ. Corp., New York, New York (1950), page 136.